United States Patent [19]
Périères

[11] 3,899,688
[45] Aug. 12, 1975

[54] DEVICE FOR CHECKING THE CONTENT OF HYDROCARBONS IN A MIXTURE OF WATER AND HYDROCARBONS

[76] Inventor: Jacques A. Périères, 3, Residence Beaumanoir-Allee des Lilas, Aix-en-Provence, France

[22] Filed: Nov. 14, 1973

[21] Appl. No.: 415,824

[30] Foreign Application Priority Data
Nov. 24, 1972   France .................. 72.42946

[52] U.S. Cl. ............. 250/576; 250/574; 356/208
[51] Int. Cl.² ........................................ G01N 21/26
[58] Field of Search .......... 250/573, 574, 575, 576; 356/70, 103, 208

[56] References Cited
UNITED STATES PATENTS

| | | | |
|---|---|---|---|
| 1,905,251 | 4/1933 | Styer | 250/573 |
| 3,320,428 | 5/1967 | Wagstaffe | 250/574 |
| 3,417,250 | 12/1968 | Kadivnik | 356/70 |
| 3,459,304 | 8/1969 | Brenchley | 250/576 |
| 3,573,470 | 4/1971 | Haley | 356/208 |
| 3,583,817 | 6/1971 | Rachlis | 250/574 |
| 3,734,629 | 5/1973 | Griffiths | 356/208 |

*Primary Examiner*—James W. Lawrence
*Assistant Examiner*—D. C. Nelms

[57] ABSTRACT

This invention relates to a device for checking the content of hydrocarbons in a mixture of water and hydrocarbons circulating in a pipe, composed on the one hand of an optical detector comprising a light emitter and receiver associated with a photoelectric element and on the other hand of an emulsifier placed upstream of said optical detector.

The invention more particularly applies to the checking of the hydrocarbon content in the water rejected by oil tankers.

3 Claims, 3 Drawing Figures

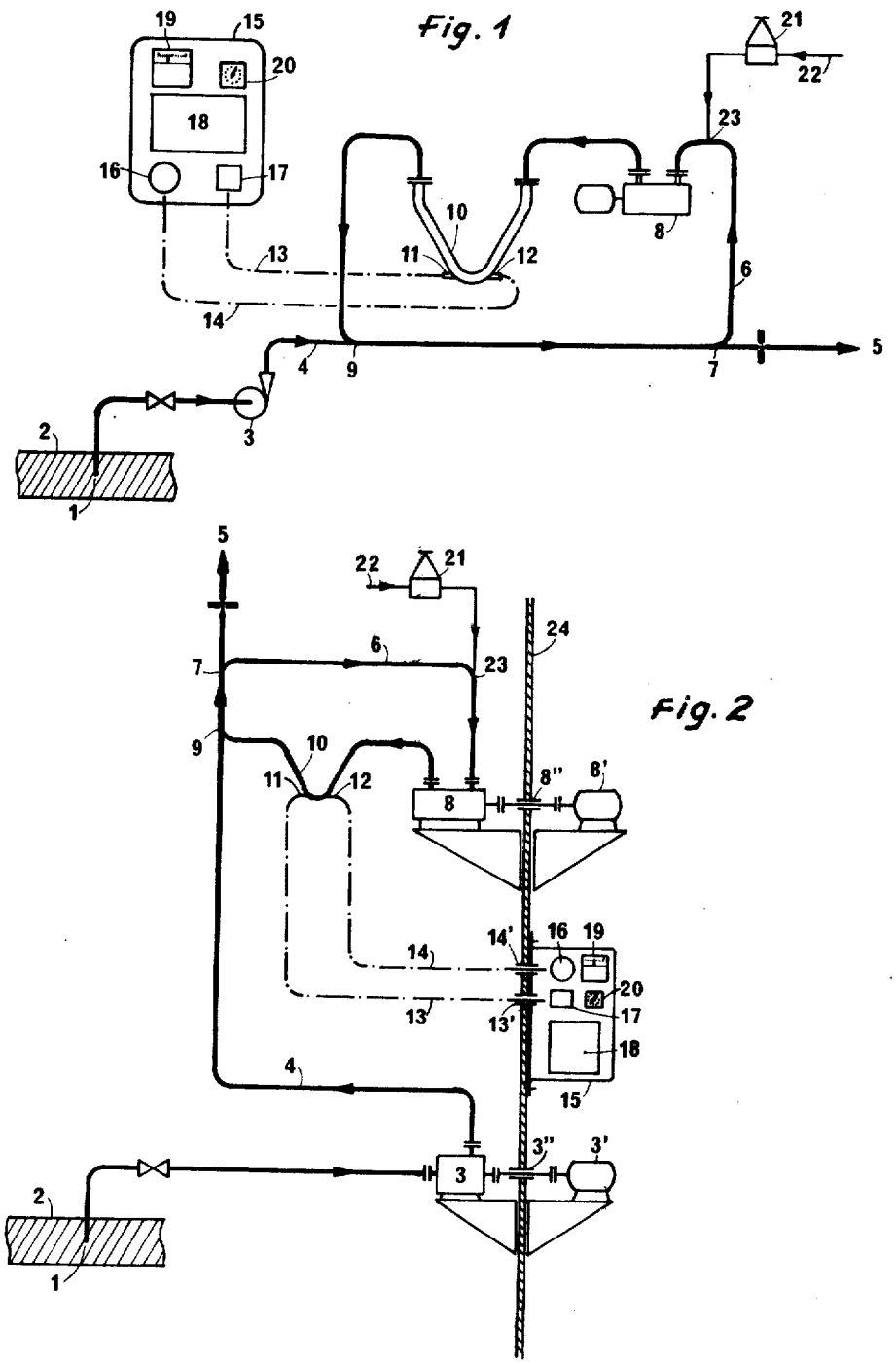

DEVICE FOR CHECKING THE CONTENT OF HYDROCARBONS IN A MIXTURE OF WATER AND HYDROCARBONS

The present invention relates to devices for checking the hydrocarbon content in a mixture of water and hydrocarbons circulating in a pipe.

Detectors are known for optically detecting turbidity or opacity of a liquid mixture, composed of a light source and a photoelectric receiver, placed opposite one another and on either side of an enclosure or pipe filled with said mixture.

Difficulties are met with in checking a mixture of water and hydrocarbons, particularly heavy hydrocarbons, by means of such a detector, since the hydrocarbons adhere to the walls of the apparatus, this rendering the measurements false.

On the other hand, the use of an electric light source and a photoelectric detector in an atmosphere capable of containing hydrocarbons presents dangers of explosion.

These difficulties have been overcome and, for checking the content of hydrocarbons in waste water rejected from tankers, use has been made of indicator apparatus composed of a light emitter and receiver disposed opposite one another, each being placed inside a tube, one end of which is constituted by a transparent spherical cap.

The two tubes are disposed on either side of a pipe in which the liquid mixture circulates at a relatively high speed, of the order of several metres per second, and the spherical caps project inside the pipe so that the liquid sweeps over the walls of the cap which remain sufficiently clean.

Such an apparatus lacks sensitivity and up to the present day has only been able to be used as pre-detector.

It then allows the mixture to be directed towards a precision oleometer, functioning according to another principle, when the water is not too polluted and this precision oleometer may be isolated to avoid it being deteriorated when the content of hydrocarbons exceeds a predetermined threshold.

One of the aims of the present invention is to improve the sensitivity and precision of a device of this type for checking the hydrocarbon content, which furthermore presents the advantages of simplicity and operational safety in an explosive atmosphere, so that such a device can serve not only as pre-detector, but also as checking device which is sufficiently sensitive, precise and reliable, whatever the content of hydrocarbons in the mixture.

A particular aim of the invention is sufficiently to improve the precision and reliability of such a device so that it can be accepted as a valid means for directing the hydrocarbon-containing water rejected by tankers or from an unballasting station towards the sea or towards a slop tank, depending on whether their hydrocarbon content is lower or higher than a predetermined threshold.

This objective is attained by adding to the optical detector an emulsifier for the mixture of water and hydrocarbons, which is placed in the same pipe, upstream of the detector.

This emulsifier is constituted by any known means for forming a very fine emulsion of hydrocarbons in the water, for example by an emulsifier pump which may be a multi-cellular centrifugal pump.

In order to improve the stability of the emulsion obtained, the device preferably comprises in addition means for injecting compressed air in the mixture upstream of the emulsifier. The flow of compressed air injected is weak.

In fact, it has been observed that the precision and reliability of the measurements of the hydrocarbon content, in a mixture of water and hydrocarbons, from measurements of opacity, was much influenced by the fineness and stability of the emulsion of hydrocarbons in the water.

In order that the opacity of a liquid sheet of constant thickness be proportional to the hydrocarbon content, the hydrocarbons must form an emulsion of which the particles are sufficiently fine for the average content of hydrocarbons to be substantially constant everywhere in the mixture.

If this condition is not fulfilled, there is the risk of a separation between the hydrocarbons and the water which completely falsifies the measurements obtained.

The addition of an emulsifier upstream of the optical detector constitutes considerable progress. It has been experimentally verified that, due to this addition, the measurements of the hydrocarbon content are very sensitive, of the order of 20 mgr/litre, very accurate, tests repeated under the same conditions having led to the same results to within about 2 percent, and very stable, prolonged tests made on the same sample having shown fluctuations of the measurement inferior to 1.5 percent.

In general, the mixture, of which the hydrocarbon content is to be checked, is taken by a drain piping from a reservoir, for example from the tank of an oil tanker, and is rejected either into the sea or into a slop tank.

The level of the mixture in the reservoir varies in the course of emptying and if a centrifugal pump is used for taking the samples to be checked, the flow of said pump varies as a function of the level of water in the reservoir.

For light flows, this leads, in the horizontal portions of pipes, to a separation of the hydrocarbons which tend to circulate along the upper generatrix of the pipes. If the content of hydrocarbons is measured by measuring the opacity on such portion of the pipe, the result obtained is completely erroneous.

Another aim of the invention is to avoid such a cause of error.

This aim is attained with the aid of a device composed of a first pipe circuit comprising a light-duty volumetric pump, for taking samples of the mixture to be checked from the axis of horizontal section of the drain pipe and of a second loop circuit, connected in shunt to the first, which second circuit starts from the delivery pipe of said volumetric pump and returns into said delivery pipe upstream of said starting point, and which second circuit comprises said optical detector and an emulsifier pump placed upstream of said detector, said emulsifier pump having a flow equal to several times that of said volumetric pump so that said samples of the mixture are recycled several times through said emulsifier pump and through said optical detector.

Another object of the invention is to have a device for checking the content of hydrocarbons, which does not present any danger of explosion.

This object is attained with a device in which the light emitter and receiver are each constituted by the end of an optical fibre placed inside a tube, one end of which is constituted by a transparent spherical cap which projects inside the pipe in which the mixture to be checked circulates; the other end of said optical fibres is placed in a casing opposite a light emitter source and a photosensitive element respectively; the volumetric pump and the emulsifier pump are driven by a motor and said motors as well as said casing are placed in a first compartment separated by a partition from a second compartment in which are located the pumps and pipes conveying the mixture to be checked, so that no electrical conductor penetrates into the second compartment, the connection between the casing containing the electric circuits and the detector being effected by the optical fibres.

The pipe in which the mixture is to be checked is preferably bent and the tubes containing the light emitter and receiver are placed on either side of said bend, in line with one another. The optical detector, being disposed in a bend, makes it possible to increase the thickness of the sheet of water which circulates between the light emitter and receiver, whatever the diameter of the pipe. It also makes it possible to obtain an improved sweeping of the ends of the tubes of the detector by the liquid current.

For a sheet of water having a thickness of 100 mm, it is possible to adjust the sensitivity of the apparatus so that it enables hydrocarbon contents to be measured which are included between 0 and 500 mg/litre or contents between 0 and 1000 mg/litre whatever the nature and origin of the crude oil.

The result of the invention is a new device which efficiently checks the hydrocarbon content of polluted water.

This device makes it possible to check the content of hydrocarbons in water unballasted from the tanks of oil tankers, with a sufficient precision for part of said water to be rejected directly into the sea without exceeding nor risking to exceed the prescribed limits.

The cleanlinness of the transparent end of the tubes containing the light emitter and receiver is ensured by the speed of circulation at the output of the emulsifier pump which is, for example, of the order of 4 metres per second.

It has been verified that after a passage of crude oil through the detector, it is sufficient to have a mixture of water and hydrocarbons circulate at this speed for 4 minutes to clean the transparent ends of the tubes and obtain an exact measurement again.

The invention will be more readily understood on reading the following description with reference to the accompanying drawings, in which:

FIG. 1 is a diagram showing the device according to the invention.

FIG. 2 is a diagram of another device according to the invention.

Figure 3:
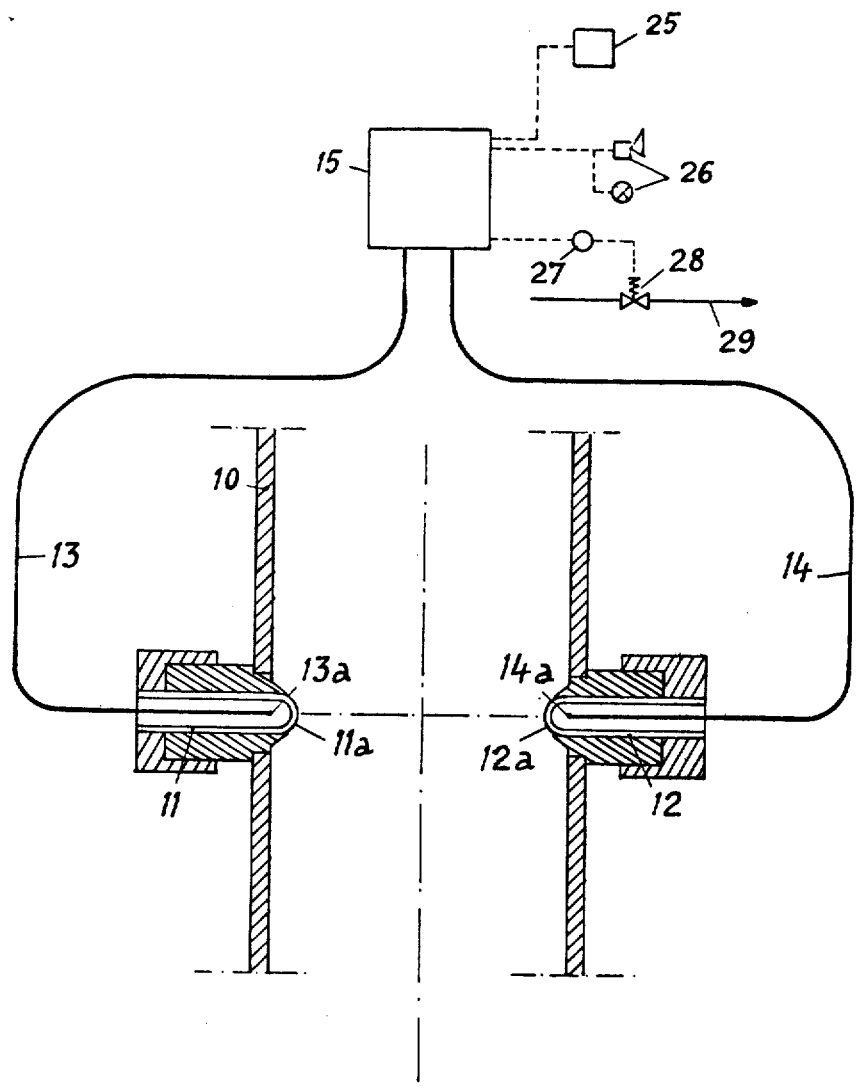
FIG. 3 is a transverse section through the optical detector.

Referring now to the drawings, FIG. 1 shows at 2 the drain pipe system of a reservoir containing a mixture of water and hydrocarbons, of which it is desired to check the hydrocarbon content. The level of the mixture in the reservoir is variable.

Pipe 1 is the pipe for taking samples and one of its ends is located in the axis of the piping 2 in order to obtain an average content.

Reference 3 represents a volumetric pump having a flow of the order of 2 m3/hour, which flow is independent of the level of water in the reservoir. The delivery piping 4 of the pump 3 opens into a slop tank 5. The piping 4 is of such a diameter that the mixture circulates at high speed when turbulent, this favouring the stability of the emulsion of water and hydrocarbons.

A loop circuit is connected in shunt to pipe 4. This circuit is composed of a suction pipe 6, connected at 7 to the pipe 4, a multicellular heavy-duty pump 8, of the order of 10 to 15 times the flow of the pump 3 and of a delivery pipe which reinjects the mixture sucked in at point 9, upstream of point 7, so that a large part of the sample is recycled a great number of times in the detector before being evacuated towards the tank 5 and so that the speed of mixture in the loop circuit is very high.

Pump 8 is a pump comprising several impellers, three for example, having a special blading form, so that the mixing of the mixture in the pump leads to a very fine division of the particles of hydrocarbons and to a very intimate and very homogeneous emulsion thereof in the water. Pump 8 may be replaced by any emulsifier pump or by any equivalent emulsifier device which is well known to the man skilled in the art.

In the loop circuit 6 is interposed a bent pipe 10 having for example a diameter 2". Two fingers 11 and 12 are disposed, opposite one another, in the bend. These fingers are constituted by a transparent tube closed at one end by a spherical cap projecting inside the tube. Each contains the end of an optical fibre 13, 14, the other end of which opens inside a casing 15 located at a certain distance. This casing contains a light source 16 and a photosensitive element 17, each disposed opposite the end of each of the fibres 13 and 14. This casing contains, in addition, an electronic measuring chain 18, an indicator or recording apparatus 19 and a multistud switch 20 enabling the sensitivity to be adjusted as a function of the origin of the hydrocarbons.

To the loop circuit 6 is connected, at 23, upstream of the pump 8, a compressed air inlet 22 whose flow is regulated by a regulator 21. This flow is weak, for example of the order of 25 litres per hour. This air contributes to the division of the spherules of hydrocarbons and to improving the stability of the emulsion.

FIG. 2 shows an installation of the same type, intended to avoid the risks of fire. This same reference numerals are used for designating the same elements.

The installation is divided into two compartments by a partition 24. On the left-hand side of the partition is located the pump compartment in which are located all the parts of the installation in contact with the mixture containing the hydrocarbons. On the right-hand side of the partition is located the motor compartment, in which are disposed the motor 3' driving the volumetric pump 3, the motor 8' driving the emulsifier pump 8 and the casing 15. The tightness of the passage of the drive shafts is ensured by stuffing boxes 3" and 8".

The optical fibres 13 and 14 pass through the partition 24 by the intermediary of tight stuffing boxes 13' and 14'.

FIG. 3 shows, on a larger scale, an optical detector composed of a light emitter 13a and a light receiver 14a, each constituted by the end of an optical fibre 13, 14 respectively, which ends are each placed inside a tube 11 and 12.

The two tubes 11 and 12 are rectilinear and are placed in alignment on either side of a pipe 10 in which circulates a mixture of water and hydrocarbons to be checked. This Figure shows the ends 11a and 12a of the tubes, constituted by transparent spherical caps, projecting into the pipe 10 so that they are swept by the current of liquid. In this embodiment, the pipe 10 has a large diameter, so that it is not necessary to place tubes 11 and 12 in a bend of the pipe to obtain a sheet of water of sufficient thickness.

FIG. 3 shows the casing 15. It also shows a recorder 25 which records the electric signal supplied by the photoelectric element which measures the content of hydrocarbons.

Reference numeral 26 represents a possible sound or luminous alarm device which is energized when the content of hydrocarbons exceeds a predetermined threshold.

Reference numeral 27 represents a relay, which is energized by the electric signal supplied by the photoelectric detector when a determined threshold of the hydrocarbon content is reached. Relay 27 acts on an automatic control, for example on an electrovalve 28 placed on a pipe 29 in which the mixture to be checked circulates.

What is claimed is:

1. Apparatus for checking the content of hydrocarbons in a mixture of water and hydrocarbons which flows from a reservoir and comprising drain piping adapted to be connected to said reservoir, a volumetric pump having a predetermined pumping capacity, said pump being connected to said drain piping for taking samples of said mixture therefrom, a delivery pipe connected to an outlet side of said pump for conveying said samples to discharge, said delivery pipe having a starting point and a delivery point, spaced therefrom, both points being upstream of said discharge, and said delivery point being upstream of said starting point, a loop circuit connected between said starting and said delivery points and including as part thereof that portion of said delivery pipe between said starting and said delivery points, said loop circuit including (a) a pipe through which said samples circulate (b) an optical detector comprising a light emitter and receiver, each being disposed inside a separate tube, one end of each tube being terminated by a transparent cap which projects inside said sample circulating pipe from opposite sides thereof, (c) an emulsifier pump upstream of said detector and having a pumping capacity greater than said predetermined pumping capacity of said volumetric pump whereby samples of the mixture are recycled several times through said emulsion pump and past said optical detector before discharge.

2. Apparatus asccording to claim 1, wherein said pipe through which said samples circulate has a bent portion, said transparent caps on said separate tubes projecting inside said pipe, within the terminus of said bent portion, from opposite sides thereof.

3. A device according to claim 1, wherein said light emitter and receiver each comprise the end portion of an optical fibre bundle extending through its associated tube and terminating at its ends opposite said cap ends in a light source and a photosensitive element respectively, each leading to and being connected within a casing which together with motors for driving said volumetric pump and said emulsifier pump are disposed on a side of a partition opposite to that side thereof where said volumetric pump, said delivery pipe and the loop circuit are located.

* * * * *